| United States Patent [19] | [11] Patent Number: 4,807,064 |
| --- | --- |
| Miyamoto et al. | [45] Date of Patent: Feb. 21, 1989 |

[54] TAPE LOADING SYSTEM FOR WRAPPING A TAPE OF A TAPE CASSETTE AROUND A GUIDE DRUM

[75] Inventors: Ritsu Miyamoto; Eiichi Tsuchiya, both of Yokohama; Kazuhiko Shishido, Tokyo; Toshiaki Shimizu, Kamakura; Atsushi Hosoya, Sagamihara, all of Japan

[73] Assignee: Victor Company of Japan, Ltd., Yokohama, Japan

[21] Appl. No.: 32,807

[22] Filed: Apr. 1, 1987

[30] Foreign Application Priority Data

Apr. 2, 1986 [JP] Japan .................................. 61-76336

[51] Int. Cl.[4] ............................................. G11B 15/66
[52] U.S. Cl. ........................................ 360/85; 360/71; 360/95
[58] Field of Search ........................ 360/84, 85, 71, 95

[56] References Cited

U.S. PATENT DOCUMENTS

| 4,583,137 | 4/1986 | Ogiro et al. ..................... 360/95 X |
| 4,672,479 | 6/1987 | Takao et al. ..................... 360/85 X |
| 4,704,644 | 11/1987 | Takenouchi .......................... 360/85 |

*Primary Examiner*—John H. Wolff
*Attorney, Agent, or Firm*—Pollock, VandeSande & Priddy

[57] ABSTRACT

Disclosed is a magnetic recording/reproducing apparatus including a guide drum having at least one recording/reproducing head and a loading mechanism for pulling out a tape from a tape cassette mounted on the recording/reproducing apparatus and for wrapping the tape around the guide drum. The loading mechanism includes first and second loading devices each having a vertical rotatable pole and an inclined pole and the first and second loading devices are engaged with first and second guide grooves and are moved along the first and second guide grooves. At least one of the first and second guide grooves is branched in the vicinity of the loading termination position into two branch grooves so that the inclined pole of the corresponding loading device is substantially and angularly displaced with respect to the vertical rotatable pole by a predetermined angle in the vicinity of the loading termination position as said vertical rotatable pole reaches said loading termination position so as to form a predetermined tape path.

3 Claims, 18 Drawing Sheets

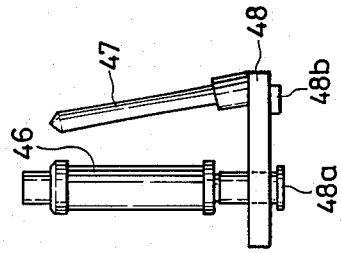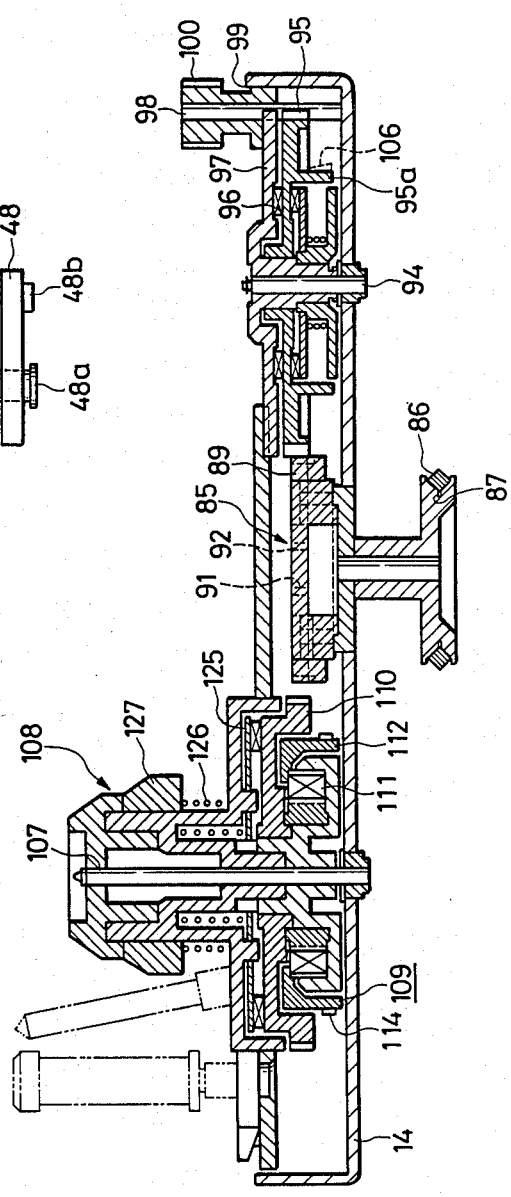

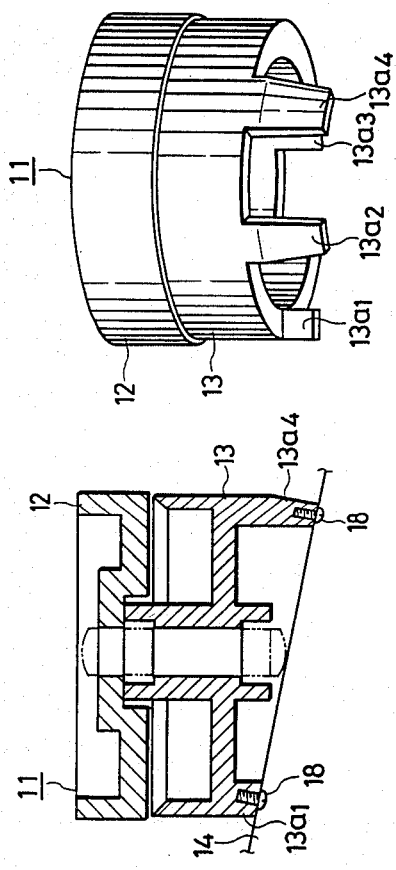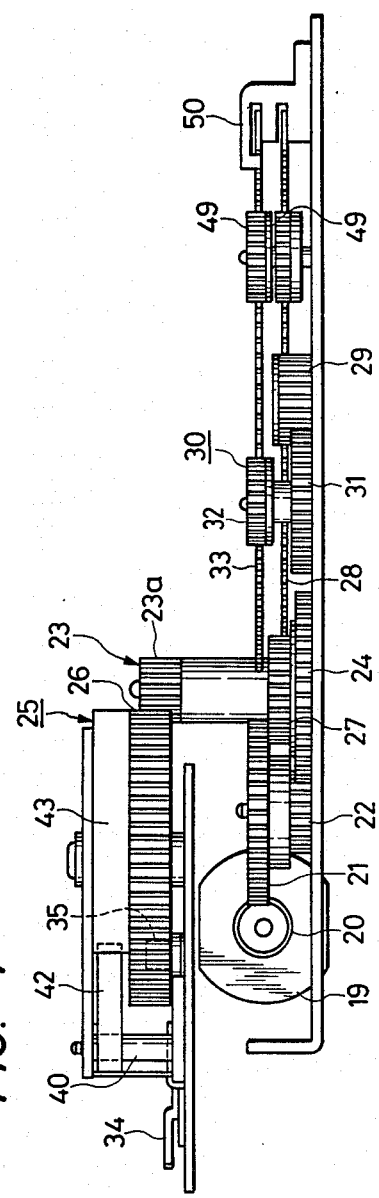

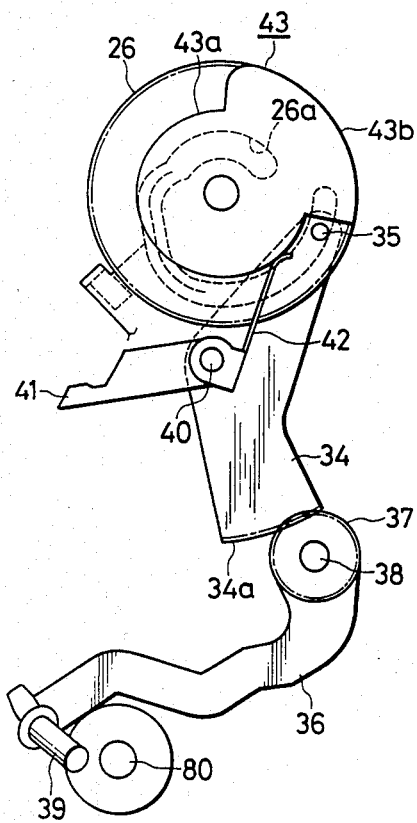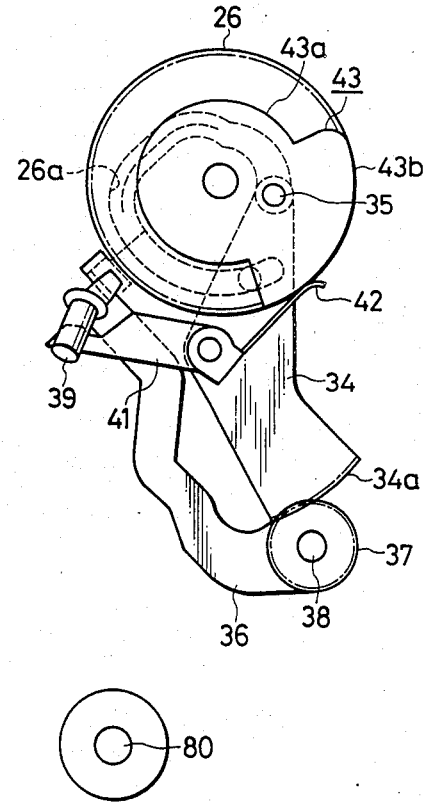

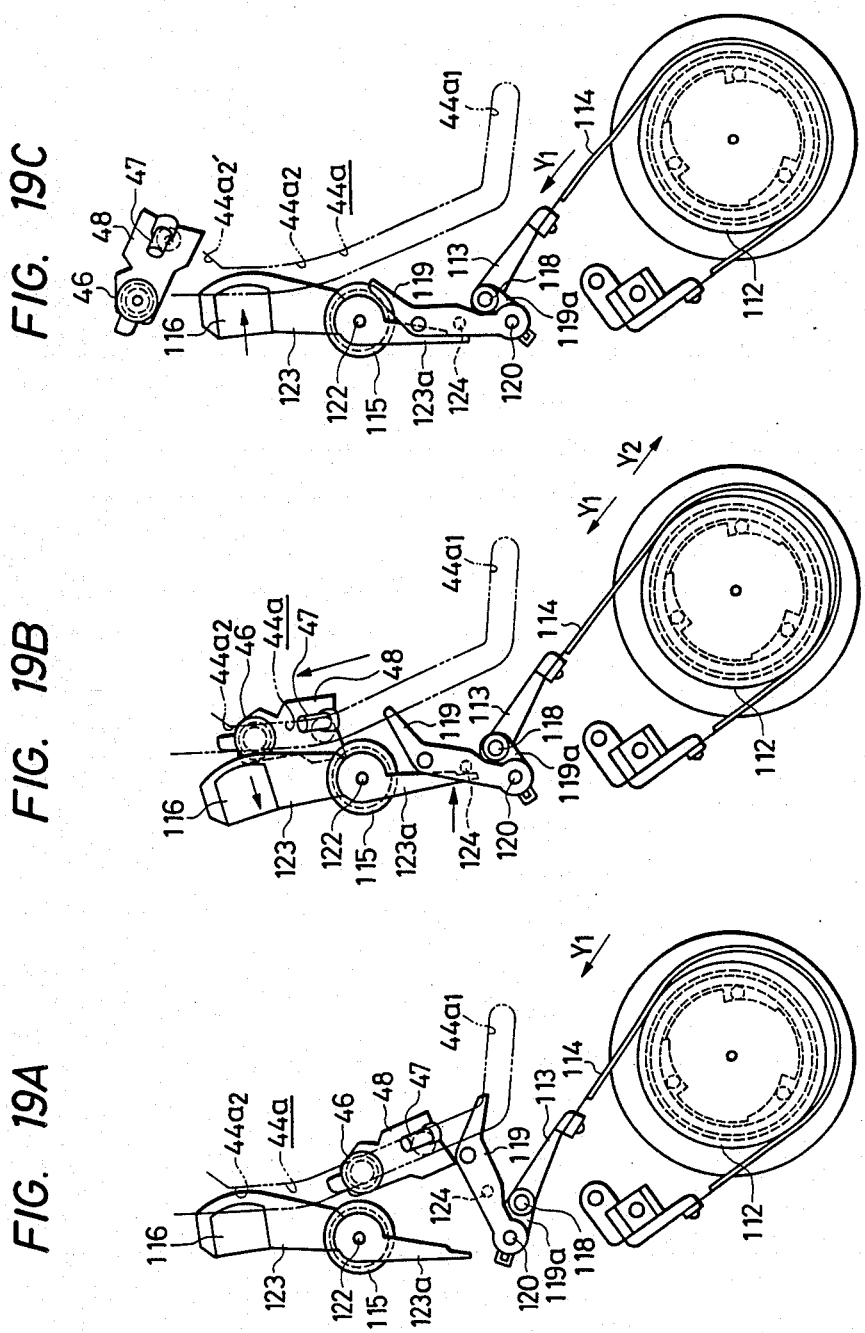

TAPE LOADING SYSTEM FOR WRAPPING A TAPE OF A TAPE CASSETTE AROUND A GUIDE DRUM

BACKGROUND OF THE INVENTION

The present invention relates generally to a magnetic recording/reproducing apparatus for recording or reproducing information with a magnetic tape being wrapped around a guide drum.

Recently, improvement for current home-use video tape recorders (VTR) is being made for further size-reduction purpose without changing the recording pattern on a magnetic tape. One approach to size-reduction of VTRs is disclosed in the U.S. Pat. No. 4,614,985 issued to the same assignee in which a magnetic tape is wrapped around a guide drum ranged about 270-degrees rather than about 180-degrees for the current VTRs and four video heads are provided at an angular distance of 90-degrees from each other to reduce the diameter of the guide drum to two-thirds of that of the current VTRs.

For keeping the tape interchangeability with the current VTRs it is required that the standard track patterns of video signals to be recorded on the magnetic tape are kept identical, and further the length of magnetic tape in the tape path from the guide drum to the audio control signal head (A/C head) is kept to the standard length of the current VTRs for proper operation of their head tracking servo control.

An example of a tape loading mechanism for a magnetic recording/reproducing apparatus showing the above approach for improvement is disclosed in the U.S. Pat. No. 4,626,938 which is assigned to the assignee of the present application and wherein the diameter of a guide drum is reduced and a magnetic tape is wrapped symmetrically around the guide drum keeping the standard length as well as the standard track patterns. The magnetic recording/reproducing apparatus is arranged such that a guide drum is disposed to be close to a tape cassette to be mounted therein for size-reduction purpose. However, in such an apparatus, loading poles such as vertical and inclined loading poles disposed on a pole base with a predetermined spacing are arranged to be moved from the initial stop position to the loading-terminated position keeping the space therebetween in the radial direction of the guide drum during tape loading. This arrangement takes up a dead space at the peripheral region of the guide drum, thereby causing difficulty of further size-reduction. In addition thereto, there is a possibility of tape damage due to the involvement of the inclined poles during tape loading as discussed later and hence difficulty is imposed to meet the requirements for size-reduction.

SUMMARY OF THE INVENTION

It is therefore an object of the present invention to provide a new and improved recording/reproducing apparatus which is capable of eliminating the above-mentioned drawbacks and saving a space at the periphery of a tape guide drum and minimizing possible tape damage.

According to a feature of the present invention, a vertical pole and an inclined pole are moved to form a file until they reach the loading termination position and the inclined pole swings at the loading termination position to form a predetermined tape path.

In accordance with an embodiment of the present invention, there is provided recording/reproducing apparatus comprising: a guide drum having at least one recording/reproducing head and a loading mechanism for pulling out a tape from a tape cassette mounted on the recording/reproducing apparatus and for wrapping the tape around the guide drum, the loading mechanism including first and second loading means each having a vertical rotatable pole and an inclined pole, the first and second loading means being engaged with guide means and being moved in accordance with the guide means, the inclined pole of at least one of the first and second loading means being substantially and angularly displaced with respect to the vertical rotatable pole by a predetermined angle in a vicinity of a loading termination position as said vertical rotatable pole reaches said loading termination position so as to form a predetermined tape path.

Preferably, the guide means comprises first and second grooves, the first loading means having leg means being guided in the first groove and the second loading means being moved along the second groove. The leg means comprises first and second leg portions and at least the first groove is branched in the vicinity of the loading termination position into first and second branch grooves for receiving the first and second leg portions respectively so that the vertical pole is guided toward the first groove and the inclined pole is guided toward the second groove so as to swing the inclined pole for forming the predetermined tape path.

BRIEF DESCRIPTION OF THE DRAWINGS

The present invention will be described in further detail with reference to the accompanying drawings, in which:

FIGS. 1 through 5 are a magnetic recording/reproducing apparatus according a preferred embodiment of the present invention in the stop state prior to mounting of a tape cassette. Of these drawings, FIG. 1 is a schematic plan view showing the magnetic recording/reproducing apparatus excluding tape guide means such as loading disc, FIG. 2 is a right side view of the apparatus shown in FIG. 1, FIG. 3 is a plan view showing a pole base drive system including a loading ring, FIG. 4B is a side view showing a supply side tape loading and guide device, and FIG. 5 is a longitudinal cross-sectional view of the tape reel drive system of FIG. 4A;

FIG. 6A is a schematic cross-sectional view of a guide drum;

FIG. 6B is a perspective view of the guide drum of FIG. 6A;

FIG. 7 is a cross-sectional view of a gear mechanism shown in FIG. 1;

FIGS. 16A and 16B are illustrations for describing the operation of a pole arm associated with an arm gear;

FIGS. 19A to 19C show the relation between a tension arm and the head base associated with the pole base.

DETAILED DESCRIPTION OF THE INVENTION

Figure 9:
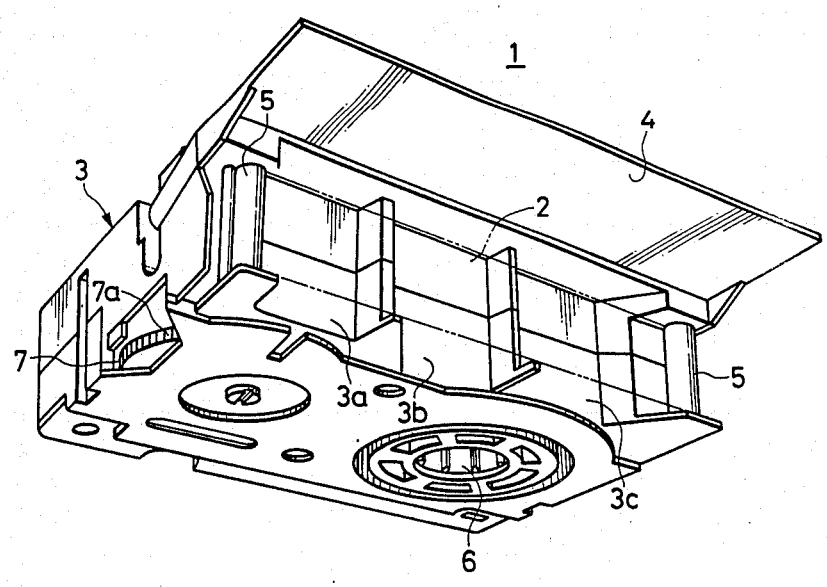
FIG. 9 is a perspective view of a small-sized tape cassette employed for the magnetic recording/reproducing apparatus according to the present invention.

Prior to describing a magnetic recording and/or reproducing apparatus according to the present invention, a description will be first made in terms of an arrangement of a tape cassette employed therefor with reference to FIG. 9.

A small-sized tape cassette 1 is mounted in a magnetic recording/reproducing apparatus 10 (which will be described hereinafter) under the conditions that a supply reel hub 6 is fitted into a supply reel driving shaft of the apparatus 10, a tooth portion 7a on the peripheral surface of a take-up reel flange 7 is engaged with a drive gear (illustrated by numeral 100 in FIG. 2), vertical and inclined loading poles, capstan and so on which will be described hereinafter relatively enter into recess portions 3a, 3b and 3c formed at the front side of a cassette housing 3, and a cover 4 is rotated and opened up to its horizontal position.

Figure 1:
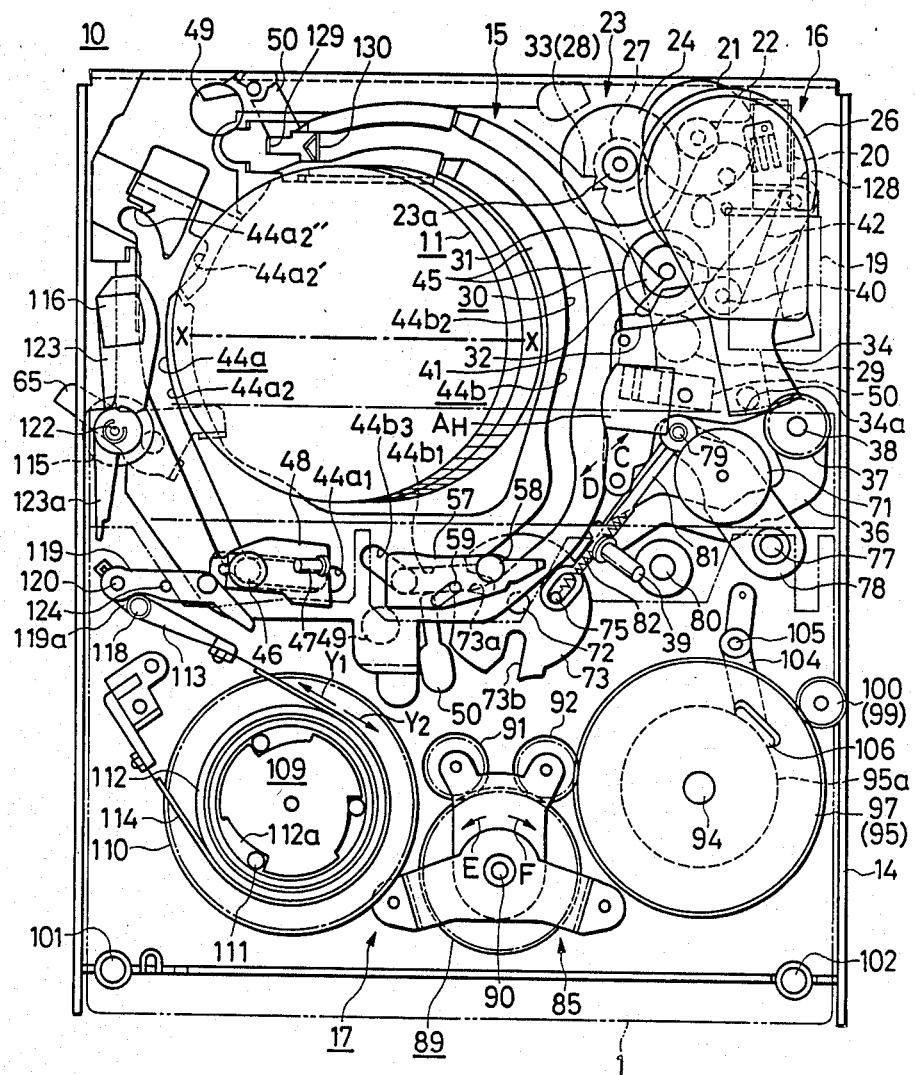
Figure 2:
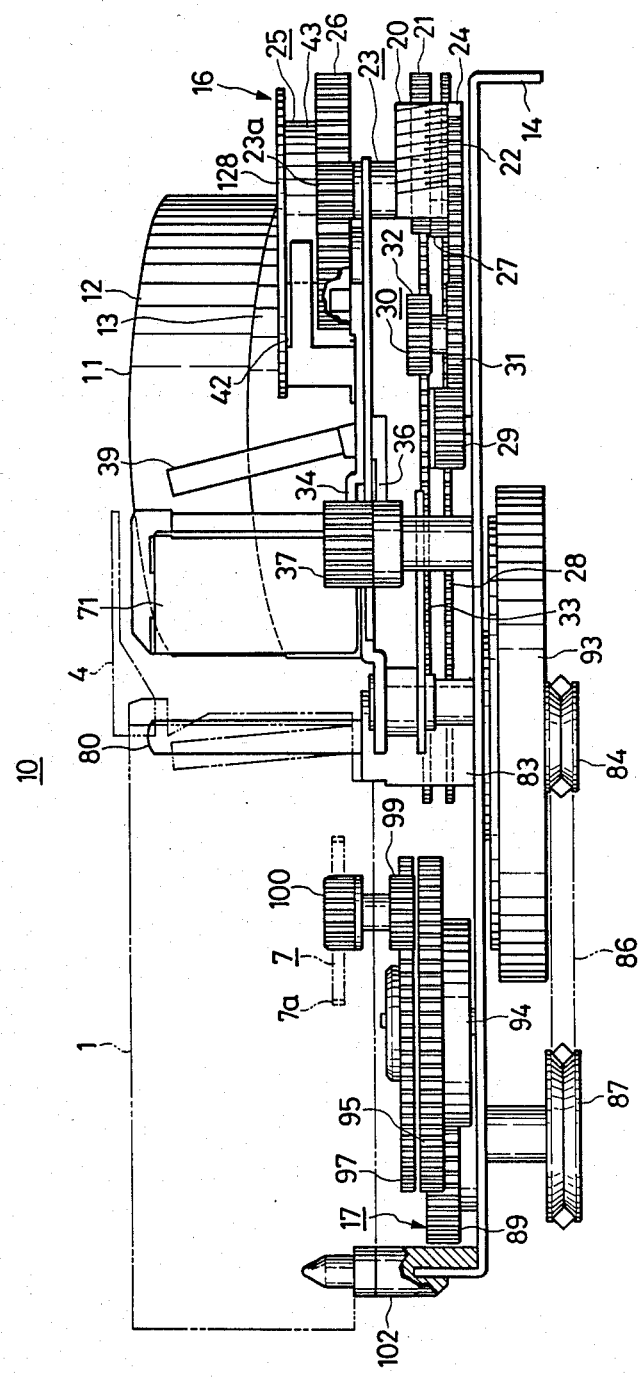
Figure 3:
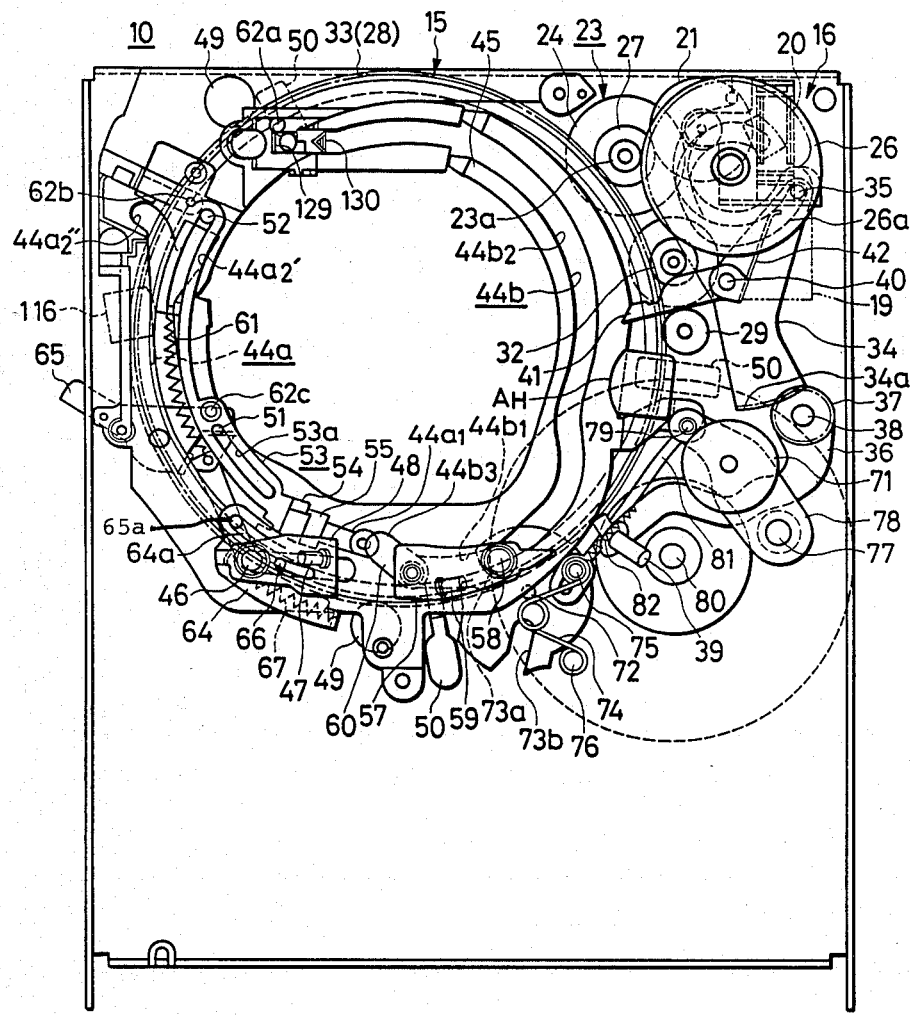

FIGS. 1 through 5 show a magnetic recording/reproducing apparatus according to a preferred embodiment of the present invention which is in the stop-mode state prior to mounting of the tape cassette 1. Of these drawings, FIG. 1 is a schematic plan view showing the magnetic recording/reproducing apparatus 10 excluding tape guide means such as a loading ring, FIG. 2 is a right side view of the magnetic recording/reproducing apparatus of FIG. 1, FIG. 3 is a plan view showing a pole base drive system including the loading ring, FIG. 4A is a plan view showing a tape reel drive system including a capstan, FIG. 4B is a side view showing a supply side tape loading and guide device and FIG. 5 is a longitudinal sectional view of the reel drive system of FIG. 4A.

In the drawings, the magnetic recording/reproducing apparatus 10 substantially comprises a tape loading mechanism 15 for pulling out a magnetic tape and for wrapping the pulled-out tape around a guide drum 11 through a predetermined angular range, a gear mechanism 16 constructed of a plurality of gear sets for driving the tape loading mechanism 15 and a middle pole which reorients the travelling-tape surface and serves as a tape guide and a reel drive mechanism 17 for driving the tape reels of the tape cassette 1 and so on, these mechanisms being installed on a chassis base 14.

In FIGS. 1 and 2, illustrated at numeral 11 is a tape guide drum, for example, wherein four video heads (rotary heads) are disposed at an angular distance of 90-degrees each other. The tape guide drum 11 comprises an upper drum 12 having the video heads and being rotatory, and a lower drum 13 fixedly secured to the chassis 14. The tape guide drum 11 is reduced in diameter to two-thirds of that of a conventional apparatus and a magnetic tape 2 is wrapped therearound ranging 270-degrees or more. The video heads are sequentially switched in units of a predetermined rotational angle as a tape-scanning angle so as to form a track pattern on the magnetic tape 2, which is identical to a standard track pattern of the current apparatus. The inclined angle of the guide drum 11 is about 10-degrees in the direction X-X with respect to its vertical axis, this is rather small in amount compared to a standard drum design, which means less height increase due to the inclination of the guide drum 11, and contributes to the overall size reduction of the apparatus 10.

The lower drum 13 of the guide drum 11 is customarily secured to the chassis with an additional drum base interposed in between to produce designed drum inclination, but in this embodiment as shown in FIGS. 6A and 6B a plurality of legs 13a1 to 13a4 having successively different lengths to correspond to the inclination angle and direction of the guide drum 11 are unitarily constructed at the bottom portion of the lower drum 13, for keeping its profile low. The legs 13a1 to 13a4 are directly secured by screws 18 to the chassis base 14, resulting that the guide drum 11 is installed with a predetermined inclined angle with great accuracy. This provides an extra space for other parts to be installed on the chassis base 14, further allowing size and weight reduction and in turn cost-reduction of the apparatus.

The gear mechanism 16 and tape loading mechanism 15 for performing so-called parallel-loading are driven by a reversible single loading motor 19. As shown in FIGS. 1, 3 and 7, the loading motor 19 for driving the gear mechanism 16 drives a terminal gear device 23 through a reduction gear. A worm 20 of the motor shaft is engaged with a worm wheel 21, and a small gear 22 while being in coaxial relation to the worm wheel 21 is engaged with a large gear 24 of the terminal gear device 23. Furthermore, a toothed portion 23a formed on the shaft of the terminal gear device 23 is arranged to rotationally drive a cam gear 26 integrally attached to a cam gear mechanism 25 for displacing a middle pole 39 which will be described hereinafter. A toothed portion formed on a shaft will be hereinafter referred to as a shaft gear.

A middle gear 27 of the terminal gear device 23 is engaged with an annular take-up loading gear (take-up gear) 28 of the tape loading mechanism 15 to rotate it counterclockwise during the tape loading around the guide drum 11 shown in FIG. 1. The take-up gear 28 drives slowly (reduction-drive) a large gear 31 of a gear device 30 engaged therewith through an idle gear 29, whereby a small gear 32 integrally mounted to the large gear 31 is driven to clockwise reduction-drive a supply loading gear (supply gear) 33 of the tape loading mechanism 15 engaged therewith. Thus, the rotational driving force produced in response to positive rotation of the loading motor 19 is transferred through the worm wheel 21 and terminal gear device 23 to the take-up gear 28 to drive it at a predetermined speed, and the supply gear 33 is rotationally driven clockwise around the guide drum 11 shown in FIG. 1 in synchronism with the take-up gear 28 by means of a further reduction-drive of the gear device 30 effected through the idle gear 29 in response to the drive of the take-up gear 28 (in this case, the take-up gear 28 is rotated counterclockwise). The difference in rotational speed between the take-up gear 28 and the supply gear 33 results from the predetermined moving path lengths of respective pole bases which will be described hereinafter.

An arm gear 34, as shown in FIGS. 16A and 16B, is rotated counterclockwise about a pivot 40 with a pin 35 provided at one end portion thereof being engaged in a spiral cam groove 26a defined in the cam gear 26 and with a sector toothed portion 34a formed at the other end portion thereof being engaged with a shaft gear 37 of a pole arm 36 having a middle pole 39 at one end portion thereof. On the arm gear 34 is provided a lock arm 41 rotatable about the pivot 40 located thereon and urged counterclockwise by a torsion spring, not shown. When the arm gear 34 is rotated counterclockwise in response to rotation of the cam gear 26, one end portion of the lock arm 41 comes onto a guide rail which will be described hereinafter and resiliently comes into contact with the peripheral surface of an upper cam 43, integrally attached to the cam gear 26, by means of a leaf spring 42 provided at the other end portion thereof.

During the stop mode, the leaf spring 42 of the lock arm 41, as shown in FIG. 16A, is in contact with a small radius portion 43a of the cam 43 to release the middle pole 39 and during the tape loading in which the arm gear 34 is rotated counterclockwise by a predetermined angle about the pivot 40, the shaft toothed portion 37 engaged with the sector gear 34a is rotated clockwise whereby the pole arm 36 which is in the state shown in FIG. 16A intersects a guide rail 45 shown in FIG. 1 and the front of an A/C head AH and moves up to a normal position as shown in FIG. 16B. On the other hand, the leaf spring 42 of the lock arm 41 is slidingly moved along the configuration of the cam 43. After the pole arm 36 has been rotated up to a predetermined stop position, the leaf spring 42 climbs up the large radius portion of the cam 43, and the lock arm 41 moves to lock the middle pole 39 as shown in FIG. 16B.

A description of the tape loading mechanism 15 will be made hereinbelow.

The tape loading mechanism 15 for wrapping a magnetic tape around the outer periphery of the guide drum 11 through about 270-degrees, as shown in FIGS. 1, 3, 8A and 8B, substantially comprises the guide rail 45 fixedly secured onto the chassis base 14 and having a supply guide groove 44a and a take-up guide groove 44b longer than the supply guide groove 44a which are substantially in symmetrical positions with respect to the guide drum 11, the supply gear 33 disposed below the guide rail 45, and the take-up gear 28 disposed below the supply gear 33.

Figure 4A:
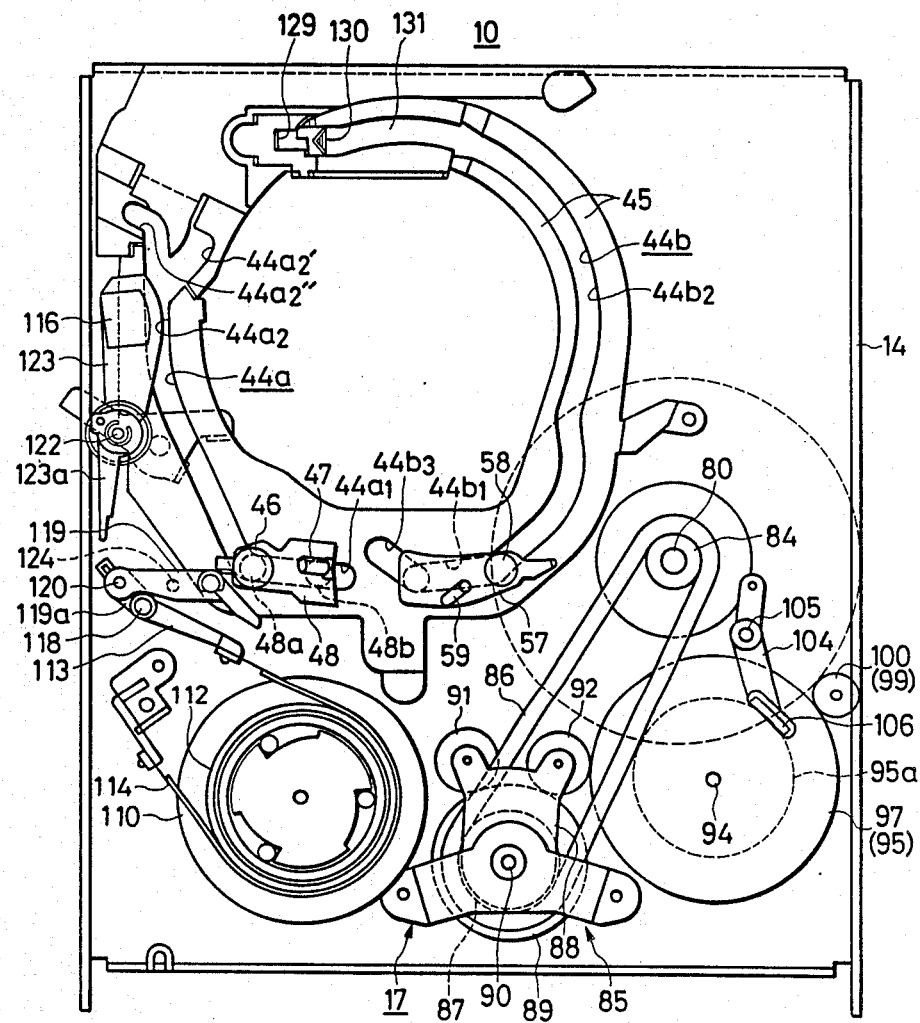
FIG. 4A is a plan view showing a tape reel drive system including a capstan.

The guide grooves 44a and 44b of the guide rail 45, as shown in FIGS. 1 and 4A, include straight portions 44a1 and 4b1 disposed in front of the inserting opening of the tape cassette 1 and arc portions 44a2 and 44b2 coupled thereto. While the supply guide groove 44a is positioned above the chassis base 14, the take-up guide groove 44b is directed gradually toward below the chassis base 14 so as to form a three-dimensionally inclined groove approximately starting from the center portion to the rear portion of the groove 44b in order to bring the magnetic tape parallel to the surface of the inclined guide drum 11.

Figure 13:
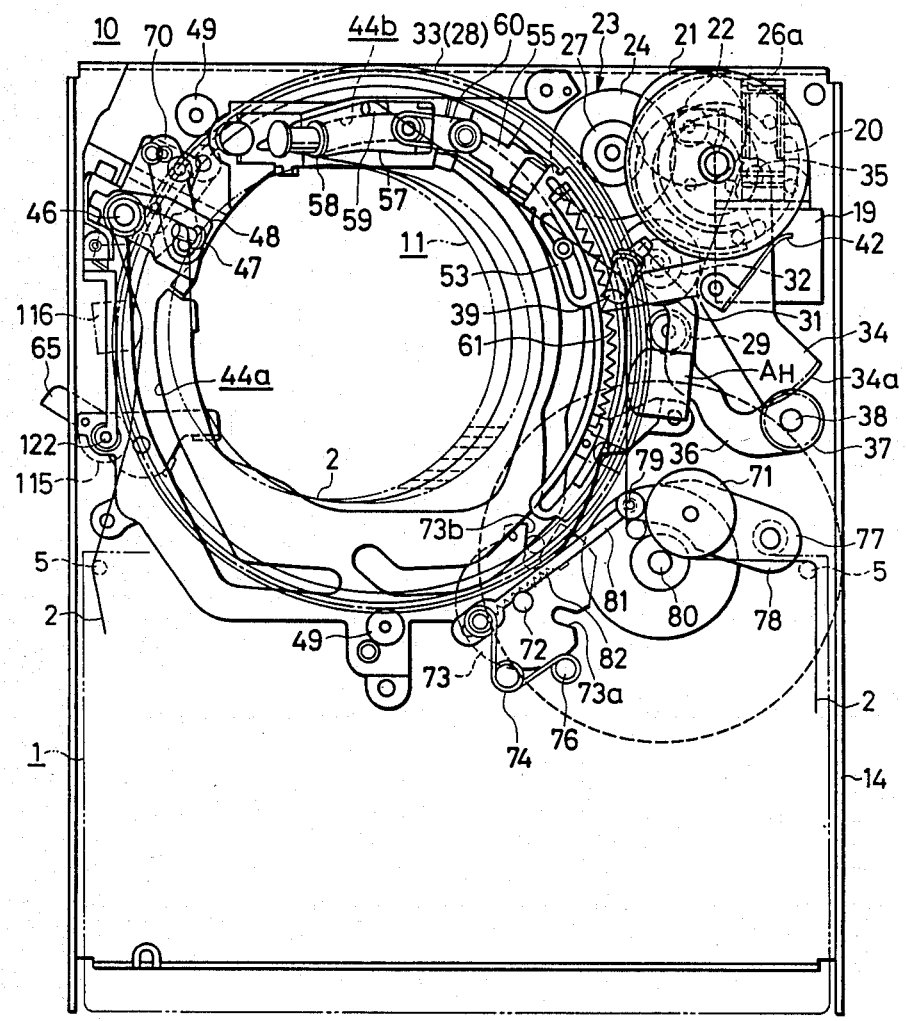
FIG. 13 is an illustration useful for describing an operation in the Recording mode.
Figure 14:
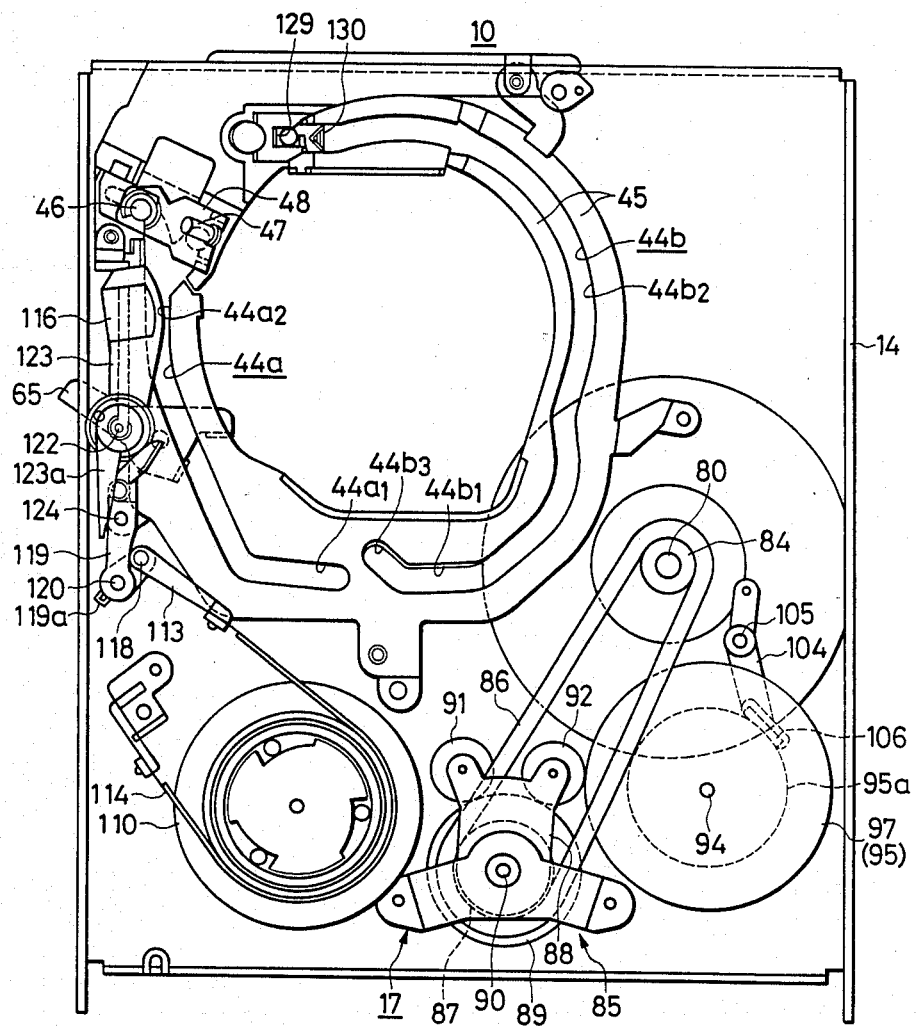
FIG. 14 shows the states of a pole base and a head base after the termination of loading.
Figure 15:
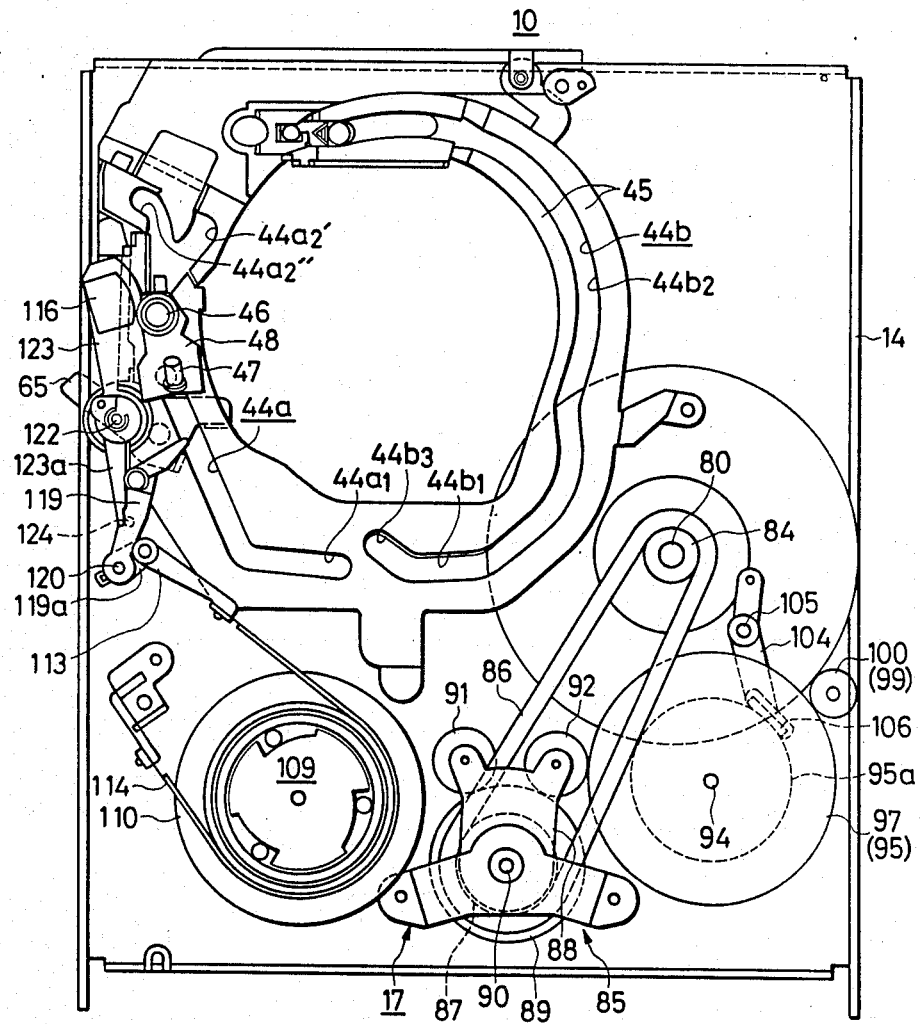
FIG. 15 is an illustration for describing the operation of the head base during loading.
Figure 17:
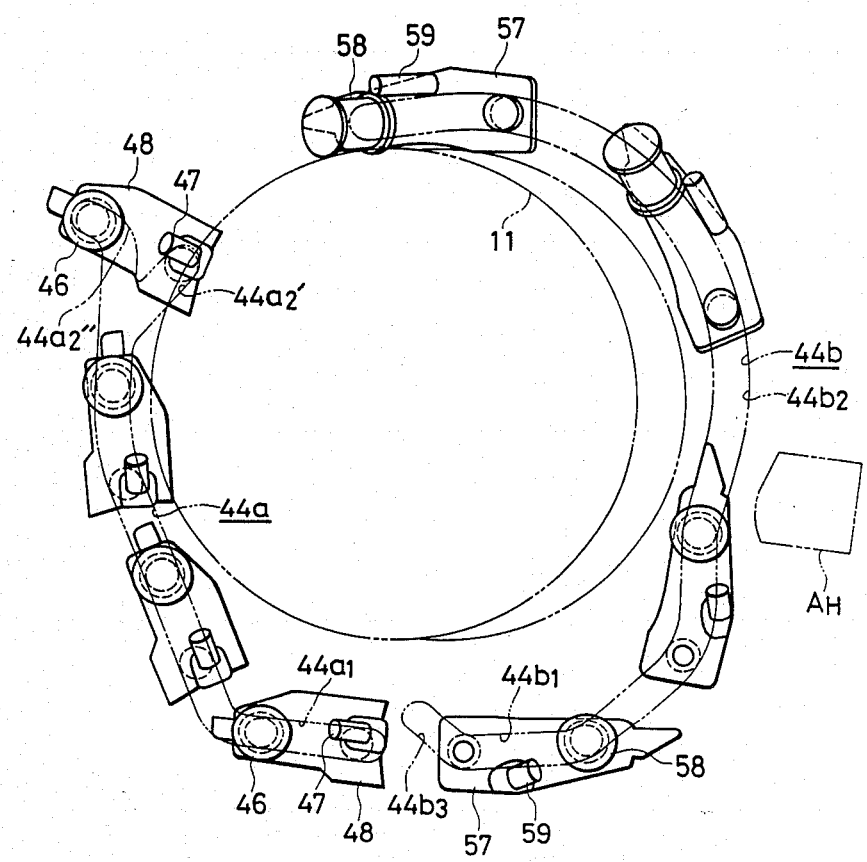
FIG. 17 is an illustration for describing the moving steps of the pole base.

One end portion of the arc portion 44a2 of the supply guide groove 44a is divided into a groove 44a2' curved toward the guide drum 11 and a groove 44a2" curved away from the groove 44a2' so as to form a Y-configuration. A rotatable vertical roller pole (vertical pole) 46 and an inclined loading pole (inclined stationary pole) 47 are close to each other and are mounted on a pole base 48 which has a forward leg 48a and a rearward leg 48b as shown in FIG. 4B both fitted into the supply guide groove 44a so that a moving position and orientation of the pole base are controlled conforming to a shape of the supply guide groove 44a. Thus, when the pole base 48 is moved from the stop mode position up to the loading terminating position along the guide groove 44a of the guide rail 45 as shown in FIGS. 13 and 17, the forward leg 48a is guided into the curved grooves 44a2" and hence the rearward leg 48b swings to displace counterclockwise along the other curved groove 44a2' about the forward leg 48b resulting that the vertical pole 46 and the inclined pole 47 are aligned approximately with a center of the guide drum 11.

More specifically, while moving for loading, the vertical pole 46 and inclined pole 47 form a file and advance along the supply guide groove 44a, and finally reoriented approximately to the center of the drum 11 due to the Y-shaped guide grooves 44a2' and 44a2" at their terminal position so that they are positioned to keep a magnetic tape in the desired play mode path. Because of the defiling, this arrangement does not take up an excessive space beside the supply guide groove 44a as compared with the case that the two poles are moved along the groove 44a keeping their final orientation from the start of the loading. Furthermore, this arrangement allows that the pulling-out of the magnetic tape is mainly effected by the vertical pole 46 and, except at around the loading terminating position, the inclined pole 47 is barely brought into contact with the magnetic tape because of the defiling, this minimizes the stress against the tape and a chance of damage thereof during the tape loading. In addition, the power consumption for pulling out of the tape cassette, which is a significant factor for a battery-operated VTR, is kept small due to less friction caused primarily by the vertical pole 46 which is a rotatable single roller. Otherwise, If the inclined pole 47 was additionally brought into contact with the magnetic tape during the loading, the stress and friction against the magnetic tape would be higher because of the magnetic tape being subjected to upward force caused by the inclination of the inclined pole 47.

In order to prevent the pole base 48 from turning clockwise and the vertical pole 46 being misguided into the groove 44a2' when the pole base 48 is approaching the end of the guide groove 44a, there is a retainer, not shown, provided underneath the pole base 48. The retainer is sliding on a ridge portion (not shown) of the guide groove 44a so as not to allow the pole base 48 turning clockwise but counterclockwise only at the end of the guide groove 44a.

Figure 8A:
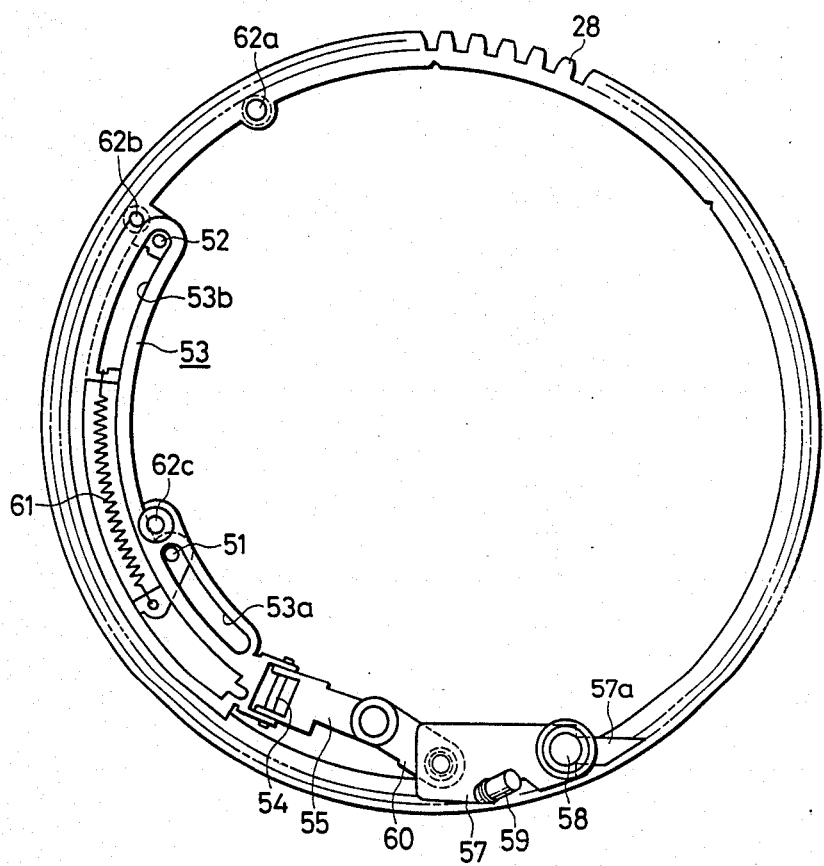
FIGS. 8A and 8B are plan views of take-up side loading ring and supply side loading ring respectively.

Detailed arrangements of the take-up gear 28 and the supply gear 33 will be hereinbelow described with reference to FIGS. 8A and 8B.

Both the take-up gear 28 and supply gear 33, as shown in FIGS. 1 and 7, are held in parallel with each other with a plurality of guide toothed wheels 49 engaged therewith and held by a guide plate 50 so as to keep a predetermined spacing in the vertical direction. As shown in FIG. 8A, on the upper surface of the take-up gear 28 is located a guide plate 53 slidingly movable along slots 53a and 53b into which pins 51 and 52 mounted on the take-up gear 28 are inserted, and the relative movement of the guide plate 53 is limited by a tension spring 61 provided therebetween. At the slot 53a side of the guide plate 53 is rotatably supported a coupling bar 55 which can be displaced upwardly and downwardly about a shaft 54. Illustrated by numeral 57 is a take-up pole base having a vertical pole 58 and a inclined stationary pole 59 which are close to each other, the take-up pole base 57 being moved along the guide rail 45 under guide of the lower portion of the vertical pole 58. The pole base 57 is, at the inclined stationary pole 59 side, pivotally coupled through a swing rod 60 to the coupling bar 55, and hence it is horizontally movable above the take-up gear 28 and also displaceable upwardly and downwardly by means of the operation of the coupling bar 55.

Thus, during the loading in which the take-up gear 28 is driven by the gear mechanism 16, when the pole base 57 is moved along the three-dimensionally inclined groove after passing through the center portion of the guide rail 45, although the spacing between a plane of the guide plate 53 and the guide rail 45 is varied, it can be brought smoothly and securely to the loading termination position as shown in FIGS. 13 and 17.

In addition, on the take-up gear 28 are planted three pins 62a, 62b and 62c which are in predetermined distance to one another, and the pins 62a and 62b are located at the rear side of the guide plate 53 in order to drive a pinch roller cam 73 which will be described hereinafter and the remained pin 62c is located a position ahead of the pins 62a and 62b with respect to the rotational direction during the tape loading so as to lock an eject lever 65 shown in FIG. 3.

Figure 8B:
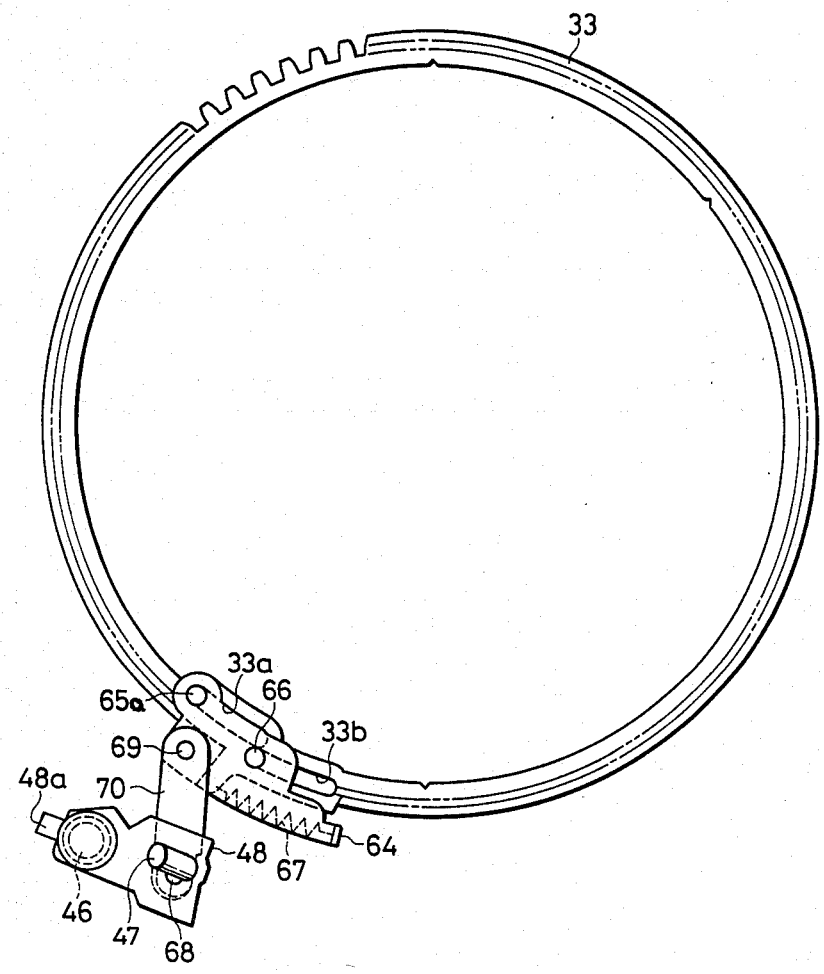

On the other hand, the supply gear 33 is arranged as shown in FIG. 8B, and on the supply gear 33 is located a guide plate 64 having pins 65a and 66 which are slidingly movable along slots 33a and 33b, and the relative movement thereof is limited similarly by a tension spring 67 provided therebetween. On the guide plate 64 is planted a pin 68 and provided a coupling bar 70 rotatable about a shaft 69. The pin 68 positions the pole base 48 to keep it in the state shown in FIGS. 1 and 3.

The operation of the pinch roller 71 made in connection with the rotational movement of the take-up gear 28 will hereinbelow be described with reference to FIGS. 3 and 18A to 18C.

Figure 12:
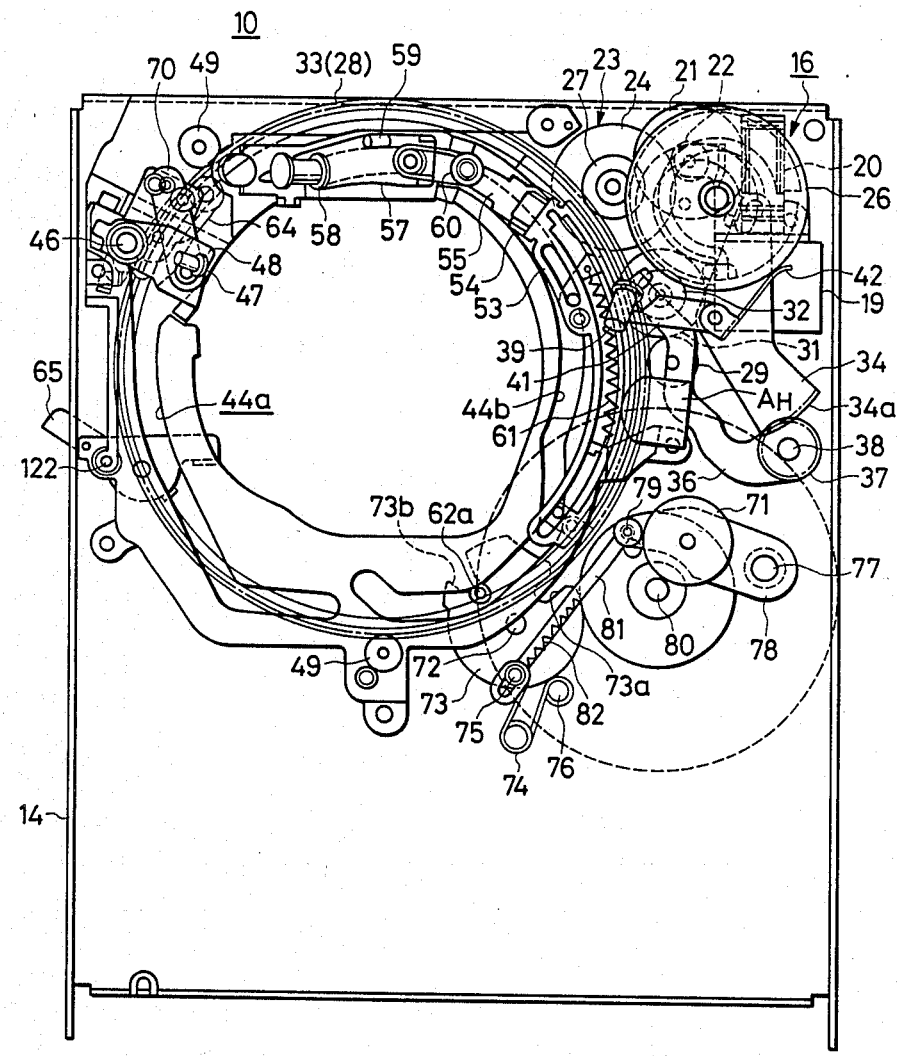
FIG. 12 is an illustration useful for describing an operation in the loading mode.
Figure 18A:
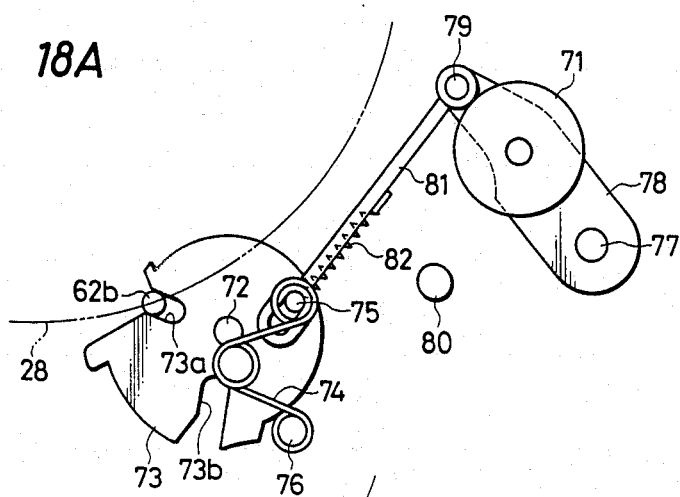
FIGS. 18A to 18C are illustrations for describing the operation of a pinch roller associated with a pinch roller cam.
Figure 18B:
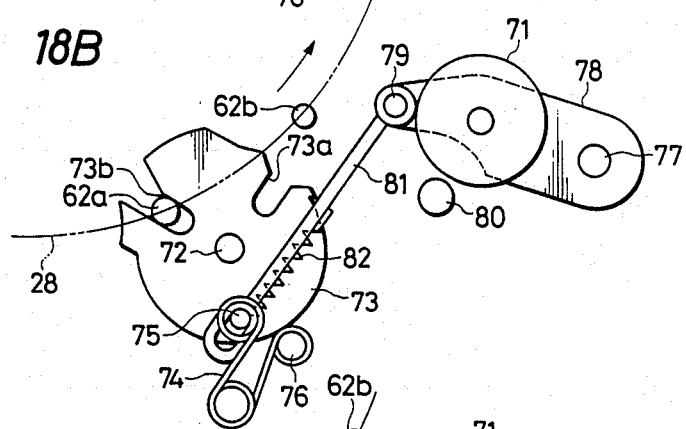

When the take-up gear 28 is rotated counterclockwise by a predetermined angle through the gear mechanism 16 by the terminal gear device 25, as shown in FIG. 18A, the pin 62b planted on the take-up gear 28 is lockingly engaged with a first locking groove 73a of a pinch roller cam 73 supported by a shaft 72. Here, the pinch roller cam 73 is rotated clockwise about the shaft 72 against a torsion spring 74 provided between a spring pin 75 installed on the pinch roller cam 73 and a fixed pin 76. A toggle mechanism is made up of a pinch roller arm 78, a link 81 and the pinch roller cam 73. In response to rotation of the the pinch roller cam 73, the pinch roller arm 78 having a pinch roller 71 is rotated counterclockwise about a shaft 77 through the link 81 connecting the spring pin 75 to a connecting pin 79, thereby moving in close to a capstan 80. When the take-up gear 28 is further rotated counterclockwise, as shown in FIGS. 12 and 18B, the pin 62a succeeding the pin 62b reaches a second locking groove 73b and the pinch roller cam 73 is further rotated compressing most the spring 74, and as a result the link 81 is further drawn in a direction D (FIG. 18C) and the pinch roller arm 78 is rotated counterclockwise about the shaft 77 to approach further the capstan 80.

Figure 18C:
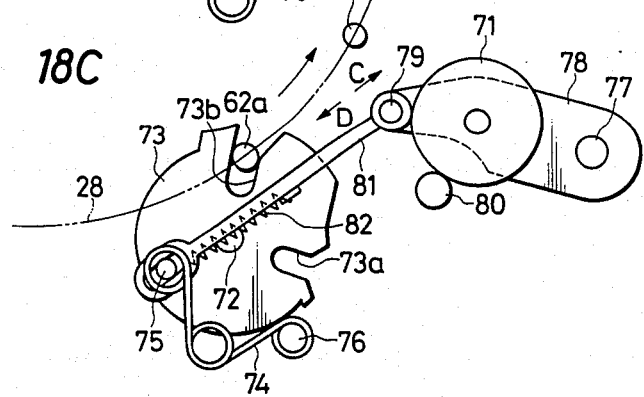

Thereafter, as the pin 62a further rotates the pinch roller cam 73, the spring pin 75 crosses the line connecting the shaft 72 and the fixed pin 76 and moves away therefrom being pushed by the spring 74 so that the pinch roller cam 73 is subject to a clockwise torque generated by the spring 74. In addition, when the spring pin 75 exceeds the line passing the shaft 72 and connecting pin 79, where the tape loading is terminated as shown in FIG. 18C, the pulling force of a spring 82 is effected to rotate the pinch roller cam 73 clockwise thus added to the clockwise torque generated by the spring 74. With this toggle action having the added clockwise torque, the pin 62b which is engaged with the second locking groove 73b of the pinch roller cam 73 is kept pressed in the direction C, accordingly the rotating force applied to the take-up gear 28 in the counterclockwise direction remains uninterrupted in the loading terminating state even after the loading motor 19 is cut-off, resulting in secure positioning of the pole base 57. Under the loading terminating state, the link 81 is still pulled in the direction D by means of the spring 82 provided between the link 81 and the pin 75 so that the pinch roller 71 is kept pressure-contact with the capstan 80 (tape travelling state).

The reel drive mechanism 17 will hereinbelow be described in detail with reference to FIGS. 1, 2, 4A and 5.

A capstan motor 83 for driving the capstan with a flywheel 93 mounted on the shaft thereof as shown in FIG. 2 reduction-drives a pulley 87 of a swing gear device 85 which is supported together with an arm 88 by a shaft 90 fixedly secured onto the chassis base 14, by means of a belt 86 and a pulley 84 integrally attached to the flywheel 93. The torque from the pulley 87 is transferred through a friction coupler (for example, felt), not shown, to an input gear 89 of the swing gear device 85 whereby a pair of planet gears 91 and 92 mounted on the arm 88 to be engaged with the input gear 89 performs friction coupled drive rotating in synchronism with each other.

The planet gear 92 positioned at the right side of the swing gear device 85, as shown in FIGS. 2 and 4A, is selectively engageable with a large gear 95 disposed at the right side thereof and rotated about a shaft 94. The large gear 95 is coupled through a friction plate 96 shown in FIG. 5 to another large gear 97 coaxially rotated therewith and having a diameter substantially equal thereto, and the large gear 97 is engaged with a small gear 99 which has integrally a small gear 100 thereabove and which is rotated about a shaft 98. Thus, when the tape cassette 1 is mounted in the apparatus 10 as shown in FIG. 2, the supply reel hub 6 is engaged with a supply reel drive shaft which will be described later, and studs 101 and 102 enter into holes (not shown) provided to the tape cassette for lateral positioning, whereby the small gear 100 is engaged with a toothed portion 7a formed on the take-up reel flange 7.

In FIGS. 1 and 4A, illustrated by numeral 104 is a brake arm supported by a shaft 105, the brake arm 104 being biased clockwise by means of a torsion spring or the like, not shown, fitted with the shaft 105. Although a brake pad 106 at one end thereof comes into frictional contact with the drum portion 95a of the large gear 95 to brake it, if it is in the recording state and so on that the magnetic tape is travelled in the take-up direction by means of the pinch roller 71 and capstan 80, the brake pad 106 is separated from the drum portion 95a in connection with the movement of the pinch roller 71 so that the braking is released.

On the other hand, the other planet gear 91 positioned at the left side of the swing gear device 85 is selectively engaged with a large gear 110, i.e., input flange, of a one-way clutch mechanism 109 within a supply reel disc device 108 supported by a shaft 107 installed on the chassis base 14. The large gear 110 is rotated together with a supply reel drive shaft 127 by means of a friction plate 125, and is coupled to a rotating body 112 by the encased one-way clutch mechanism 109 having rollers 111. The, rotating body 112 is wound with a tension band 114 one end of which is connected to an arm lever 113, and another end anchored to the chassis base 14. The arm lever 113 is further coupled to a tension arm 119 which will be described hereinafter.

Therefore, in the recording/reproducing in which the capstan 80 is positively rotated, the swing gear device 85 is rotationally moved in the direction indicated by F in FIG. 1 and the planet gear 92 is engaged with the right side large gear 95 to rotate it clockwise which in turn rotates the drive gear 100, thus as explained before, the take-up reel is driven clockwise at its reel flange 7 by the drive gear 100 for taking up the magnetic tape 2. As a result, the supply reel drive shaft 127 directly coupled to the supply reel hub 6 of the tape cassette 1 is rotated clockwise, and hence the rollers 111 are squeezed into wedge-like recess portions of the rotating body 112 so that the rotating body 112 is rotated clockwise therewith. During the rotation of the rotating body 112, the tensile force of the tension band 114 is generated to apply a proper back tension to the magnetic tape whereby the magnetic tape is wound around the take-up reel.

Furthermore, in the reverse travelling mode (rewind mode) of the magnetic tape that the swing gear device 85 is rotated counterclockwise (E direction), the other planet gear 91 is engaged with the large gear 110 rotated together with the supply reel drive shaft 127 by means of the friction plate 125 and the rollers 111 is moved to escape from the wedge-like recess portions 112a of the rotating body 112 so that the supply reel drive shaft 127 is rotated in the tape-rewind direction free from the restraint of the tension band 114.

Therefore, for example, in changing from the take-up mode in which the magnetic tape 2 is transported from the supply reel hub 6 to the reverse travelling mode such as rewind, when the engagement of the planet gear 92 of the swing gear device 85 and the large gear 95 is released, the planet gear 91 thereof is concurrently engaged with the large gear 110 of the supply reel drive shaft 127 to immediately reverse it. Thus, it is possible to obtain a smooth and high response with less parts and to reduce the load applied to the capstan motor 83 thus less power consumption. In addition, since the reverse travelling such as rewinding the tape can be performed by the one-way clutch mechanism 109 encased within the supply reel drive shaft 127 without loosening the tension band 114, it is possible to perform a desired operation with the mechanisms being simplified, resulting in size-reduction and weight-reduction of the apparatus 10.

With reference to FIGS. 1, 14 and 19A to 19C, a description will hereinbelow be made in terms of the arm lever 113, a full-tape-width erasing head 116 and the tension arm 119 operated in connection with the pole base 48 of the supply side.

The tension arm 119 rotatably pivotally supported by a shaft 120 installed on the chassis base 14 is positioned such that one end portion thereof is engageable to be locked by the pole base 48 in the stop state and rotatably pivotally supports the arm lever 113 at the base portion 119a. Although the tension arm 119 is urged counterclockwise by biasing means, not shown, such as a torsion spring, when it is in the stop state shown in FIG. 1, it is locked by the supply pole base 48 returned to the rest position so as to stop against the force of the torsion spring. In the stopping state of the pole base 48, the tension band 114 is loosened with respect to the rotating body 112.

An impedance roller 115 is fixedly disposed between the full-tape-width erasing head 116 and the tension arm 119 to control the vibration of the travelling tape. A head base 123 on which the full-tape-width erasing head 116 is placed is rotatably supported by a shaft supporting the impedance roller 115 and biased by a spring, not shown, to provide a rotational force clockwise, and a lock portion 123a in one end portion of the head base 123 is positioned to allow a pin 124 of the tension arm 119 to be lockable.

Thus, on the tape loading, when the supply side pole base 48 is moved to the loading terminating position with the vertical roller pole 46 as a leading portion being moved along the supply side groove 44a, the tension arm 119 being in the state shown in FIG. 1 is gradually separated from the pole base 48 in the moving process of the pole base 48 from the straight portion 44a1 into the arc portion 44a2 as shown in FIG. 19A, and therefore the tension arm 119 is released from the locking state and is allowed to rotate counterclockwise about the shaft 120 by means of self-returning force of the torsion spring. By the rotation of the tension arm 119, as shown in FIG. 19B, the pin 124 locks the lock portion 123a of the head base 123 having the full-tape-width erasing head 116 thereon, resulting in locked state. With the pin 124 coming into contact with the head base 123 by the rotation of the tension arm 119, when the pole base 48 is subsequently moved, it comes into contact with one side of the head base 123 to push and rotate the head base 123 counterclockwise about the shaft 122. Since the tension arm 119 is slightly rotated clockwise in the rotation of the head base 123, the tension band 114 becomes in the loosened condition. When the pole base 48 has reached the loading terminating position, the head base 123 rotationally displaced to the state shown in FIG. 19B is returned, as rotating clockwise about the shaft 122, to the initially set position as shown in FIG. 19C. Concurrently with the rotation of the tension arm 119, the arm lever 113 is drawn in a Y1 direction as shown in FIG. 19C and a braking force is applied to the rotating body 112 to set it in the tightened state.

During the tape unloading, the head base 123 and the tension arm 119 are operated reversing the loading process, and therefore a description of the operation is omitted. During the tape loading and tape unloading, since the position of the head base 123 is controlled as desired in its operation, it is possible to properly design the operating timing of the tension arm 119. In addition, since the loosening and tightening of the tension band 114 can be performed with a simple structure, it is possible to achieve the purposes with less parts and small space without disturbing the tape transportation, thereby improving the productivity in terms of weight-reduction and ease of assembling.

The operation of the magnetic recording/reproducing apparatus 10 will hereinbelow be described in detail. A series of operations of functioning parts are performed by a mode sensor section 128 provided on the cam gear 26 shown in FIG. 1.

When in the stop mode state shown in FIGS. 1 and 4A the tape cassette 1 as shown in FIG. 9 is inserted into a cassette holder, not shown, lifted above the upper surface of the apparatus 10 and the cassette holder is manually pressed down, it is dropped to a predetermined position in the apparatus 10 by means of a pantagraph mechanism, not shown, disposed below the cassette holder whereby the tape loading is prepared.

FIG. 12 is a plan view showing the recoding lock mode state after the tape loading of the magnetic recording/reproducing apparatus 10 and FIG. 13 is a plan view showing the tape loading mechanism in the tape loading completion state.

Figure 11:
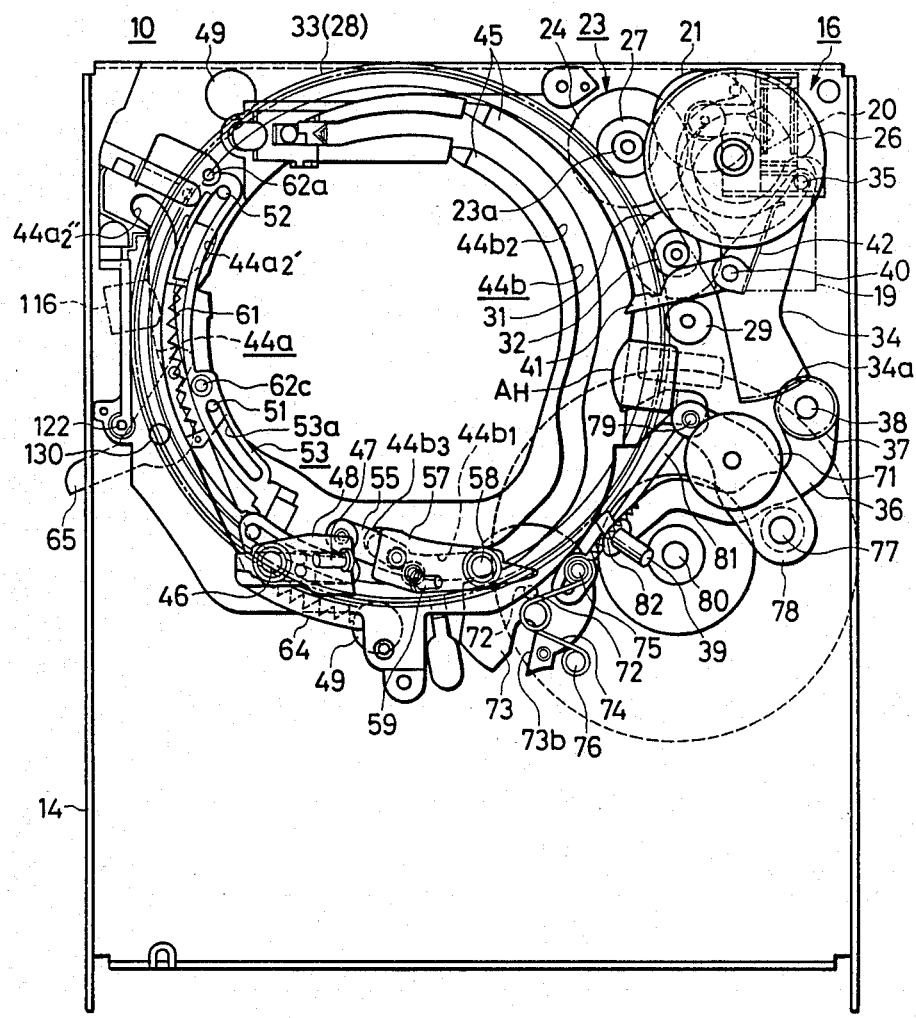
FIG. 11 is a plan view showing an eject lever and a pole base in the eject mode.

When the apparatus 10 is in the stop mode state shown in FIG. 1, in response to the turning-on of a power switch and the depressing of an eject switch, the loading motor 19 is reversely rotated and the pin 62c of the take-up gear 28 locks the eject lever 65 to rotate it counterclockwise about a shaft 130 shown in FIG. 11. By the rotation of the eject lever 65, the lower portion of the pantagraph mechanism of the cassette holder locked by the eject lever 65 is released from the lock state for allowing the cassette holder to lift. At this time, the supply side pole base 48 and the take-up side pole base 57 are slightly moved back to the straight portion 44a1 and arc portion 44b3 of the guide grooves 44a, 44b in the direction opposite to the moving direction on loading. When this eject mode is detected by the mode sensor section 128, the eject lever 65 and the pole bases 48, 57 are respectively returned to the positions shown in FIG. 1. Furthermore, when the tape cassette 1 shown in FIG. 9 is inserted into the lifted cassette holder and the cassette holder is dropped into the apparatus, a locking means provided in the cassette holder is engaged with a fixed pin provided in the apparatus so that the cassette holder is held at a predetermined position of the apparatus 10.

In response to the fact that the tape cassette 1 is held at the predetermined position of the apparatus 10 as shown in FIG. 2, as described above, the loading motor 19 starts to reduction-drive in positive direction the terminal gear device 23 through the worm 20, worm wheel 21 and so on coupled thereto. The operation of the terminal gear device 23 is transferred through the middle gear 27 provided thereon to the take-up gear 28 of the tape loading mechanism 15 which take-up gear 28 is in turn driven counterclockwise in FIG. 3 around the guide drum 11 shown in FIG. 1. On the other hand, the take-up gear 28 drives the large gear 31 and small gear 32 of the gear device 30 through the idle gear 29 whereby the torque is transferred to the supply gear 33 of the tape loading gear mechanism 15 to rotate it clockwise in FIG. 3 around the guide drum shown in FIG. 1 in synchronism with the take-up gear 28 at a reduced speed.

Furthermore, by the operation of the terminal gear device 23, the cam gear integrally connected to the cam gear mechanism 25 coupled thereto is rotationally driven. Thus, the arm gear 34, the pin 35 of which is engaged with the spiral cam groove 26a of the cam gear 26, is rotated counterclockwise to be transferred from the state shown in FIG. 16A to the state shown in FIG. 16B. The rotation of the arm toothed portion causes the sector gear 34a formed at one end portion thereof to rotate the shaft gear 37 of the pole arm 36 having the middle pole 39, so that the pole arm 36 is rotated clockwise about the pivot 38.

Accordingly, in the case that the pole arm 36 having the middle pole 39 is rotated clockwise to intersect the guide rail 45 and the fixed A/C head AH and the middle pole 39 is moved from the state shown in FIG. 16A to the normal position shown in FIG. 16B, the leaf spring 42 of the lock arm 41 rotatable about the pivot 40 of the arm gear 34 is moved with a delay along the configuration of the cam 43 to lock the base portion of the middle pole 39. Furthermore, in response to the operation of the supply gear 33 located above the tape loading mechanism 15, the pole base 48 coupled thereto and having the vertical roller pole 46 and the inclined fixed pole 47 is rotated clockwise in FIG. 1 along the guide rail 45 up to a predetermined position.

In accordance with the movement of the supply side pole base 48, the tension arm 119 which is locked by the pole base 48 and which is biased counterclockwise by the torsion spring is released from the locking state of FIG. 19A to rotate counterclockwise so that the pin 124 locks the lock portion 123a of the head base 123, as shown in FIG. 19B. By the rotation of the tension arm 119, the pin 124 comes into contact with the head base 123, and the further movement of the supply side pole base 48 causes a further rotational displacement of the head base 123.

Since the tension arm 119 is slightly rotated in response to the rotation of the head base 123, the band 114 is relaxed in the direction indicated by Y2 and the supply side reel drive shaft 127 is kept free from braking. As the pole base 48, as shown in FIG. 19C, is rotationally displaced counterclockwise past the arc portion 44a2 of the groove 44a and reaches the loading terminating position, the rotationally displaced head base 123 is rotationally returned clockwise about the shaft 122 to take the predetermined position, and the tension band 114 is drawn in the Y1 direction to bind a reel disc whereby a back tension is produced and applied to the magnetic tape.

On the other hand, when, by the operation of the take-up gear 28 disposed below the tape loading mechanism 15, the pole base 57 coupled thereto and having the vertical roller pole 58 and the inclined fixed pole 59 is rotated counterclockwise in FIG. 1 by a predetermined angle along the guide rail 45, the leading pin 62b provided on the take-up gear 28 engages the first lock groove 73a of the pinch roller cam 73 supported by the shaft 72 as shown in FIG. 18A. The pinch roller cam 73 is rotated clockwise about the shaft 72 against the spring 74 provided between the fixed pin 76 and the spring pin 75 installed thereon. This rotation of the pinch roller cam 73 causes the pinch roller arm 78 having the pinch roller 71 to rotate counterclockwise about the shaft 77 through the link 81 connecting the connecting pin 79 and the spring pin 75 so that the pinch roller 71 moves in close to the capstan 80.

When the trailing pin 62a reaches the second lock groove 73b of the pinch roller cam 73 as shown in FIG. 18B in accordance with subsequent rotation of the take-up gear 28 counterclockwise, the pinch roller cam 73 is rotated with the spring 74 being further bent and therefore the link 81 is now drawn in the direction indicated by D in FIG. 18C and the pinch roller arm 78 is rotated counterclockwise about the shaft 77 to approach the capstan 80. By a further rotation of the take-up gear 28 which causes a further clockwise rotation of the pinch roller cam 73, the spring pin 75 exceeds the line connecting the shaft 72 and fixed pin 76 and when the loading operation is terminated, the pinch roller cam 73 is biased clockwise by means of the toggle action of the spring 74 and therefore clockwise torque of the pinch roller cam 73 is now applied to the take-up gear 28 by means of the pin 62a in its rotational direction to secure the loading terminating position of the pole base 57.

Concurrently with the positioning of the pole base 57, the link 81 connecting the pinch roller 71 and the pinch roller cam 73 is changed from the state shown in FIG. 18B to the state shown in FIG. 18C whereby the spring 82 provided therebetween pulls the pinch roller 71 bringing it into resilient contact with the capstan 80. The resilient force produced by an elasticity of the pinch roller body is acting the pinch roller cam 73 turning clockwise which is added to the spring 74's securing action for the pole base 57 discussed before. That is, the spring 82 acts as a second toggle spring. The Recording/Pause state of FIG. 13 represents a state that the capstan 80 is stopped.

Figure 10:
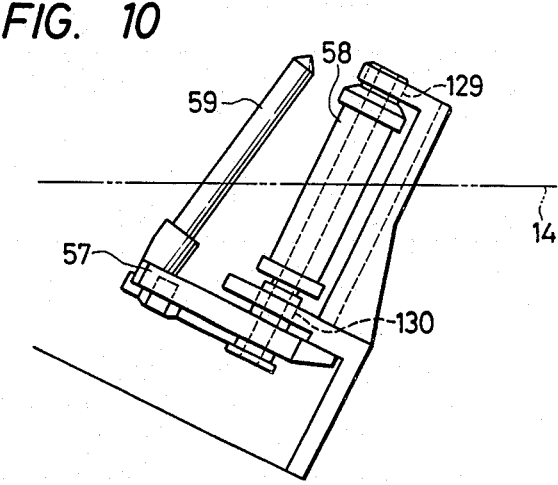
FIG. 10 is a side view showing a take-up side tape loading and guide device.

The accuracy of the positioning of the take-up side pole base 57 in three-dimensional planes as shown in FIG. 10 is improved because the vertical roller pole 58 thereof is supported by a U-shaped recess portion 129 defined at the upper end portion of the guide groove 44b and a V-shaped recess portion 130 defined at the lower end portion thereof as shown in FIG. 1. Furthermore, the vertical roller pole 46 of the pole base 48 similarly comes into contact with an unshown stopper and the positioning thereof is effected by the upper U-shaped recess portion and lower V-shaped recess portion. The magnetic tape 2 delivered from the supply reel hub 6 is wrapped around the guide drum 11 having a tape path extended from the impedance roller 115 to full-tape-width erasing head 116, the supply side vertical pole 46 and inclined pole 47, to the drum 11, from the drum 11 that tape path goes between the capstan 80 and the pinch roller 71 through the take-up side vertical pole 58, inclined pole 59, rotationally displaced middle pole 39 and A/C head AH, and after the capstan 80, it finally reaches the take-up reel.

Here, when a recording switch, not shown, is turned on, the capstan motor 83 is positively rotated (clockwise) to rotate the pulley 87 coupled thereto by the belt 86. The clockwise torque of the pulley 87 is transferred through a friction plate (felt) and so on, not shown, of the input gear 89 of the swing gear device 85 to the gear 92 of the pair of planet gears 91, 92 attached to the arm 88 resulting in the gear 92 rotating counterclockwise. The rotational force of the planet gear 92 is transferred to the lower large gear 95 and then to the upper large gear 97 through the friction plate 96, reaching the small gear 99. Thus, in the state that the tape cassette 1 is mounted on the apparatus 10, the torque transferred to the small gear 100 is then transferred to the toothed portion 7a on the peripheral surface of the take-up reel flange 7 within the tape cassette 1, resulting in the rotation thereof (Recording state of FIG. 13).

In response to further operation of the recording switch for interrupting the recording operation (Recording/Pause), the capstan motor 83 is switched from positive (clockwise) to reverse rotation (counterclockwise). With this switching, the planet gear 91 is now engaged with the supply side large gear 110, i.e., on the input flange of the one-way clutch mechanism 109, so that the torque transferred from the capstan motor 83 is transferred thereto and then transferred through the frictional plate 125 and coil spring 126 to the supply reel drive shaft 127 to rotate the hub 6 within the tape cassette 1. This causes the tape being wound around the supply reel by the length corresponding to several video frames, this restricting operation into the supply side is called back spacing.

Having the pair of planet gears 91 and 92 engaged with the input gear 89 of the swing gear device 85, the angular displacement of the swing gear device 85 is kept minimum, which in turn eliminates an unrecorded blank space on the magnetic tape 2 when the recording operation is resumed, this also minimizing a possible tape damage which may otherwise occur due to a slackened magnetic tape, and further uninterrupted recording and read out of a control pulse by the A/C head AH is performed. At this time, since the rollers 111 of the one-way clutch mechanism 109 encased within the supply side reel disc are released, the tape take-up by the supply reel is possible even when the tension band 114 is braking the rotating body 112. Thereafter, the capstan motor 83 is again advanced in the positive direction by the amount corresponding to several video frames less than the back spaced amount and then stopped. Furthermore, when the recording switch is further operated, the capstan 80 is positively rotated by means of the positive rotation of the capstan motor 83.

When the power switch is turned on under the condition of the Recording or Recording/Pause state shown in FIG. 13, with the operation as described above, the loading motor 19 is rotated in reverse and the loading ring is rotated in connection therewith to separate the pinch roller from the capstan 80. In response to the detection of this state by the mode sensor, the apparatus 10 is returned to the recording lock state as shown in FIG. 12. Thereafter, the power switch is turned off after elapse of a predetermined time period, except for the continuous recording. Under this state, if the power switch is turned on again, the loading motor 19 is positively rotated to bring the apparatus to the Recording/Pause state as shown in FIG. 13, and in response to further operation of the recording switch, it is turned to the recording mode to perform a desired recording. When an eject switch, not shown, is turned on in response to the termination of the predetermined recording, the loading motor 19 is reversely rotated to enter into the unloading state. In the unloading state, the pin 62c of the side loading ring 33 presses the eject lever 65 to release the engagement with a locking means of the cassette housing, lifting the cassette housing to allow the removal of the tape cassette 1. When the mode sensor section 128 detects this eject mode, the loading motor 19 is positively rotated, resulting in the stop mode state shown in FIG. 1 or 3.

Although in the embodiment of the present invention the description has been made in terms of recording, the reproducing can similarly be performed.

In a magnetic recording/reproducing apparatus according to the present invention, the following advantages can be obtained:

(1) saving of the moving space around the drum for the pole base, resulting in making small the apparatus;

(2) height-reduction of the apparatus because the tape drive system the layout of which is minimized in height above the chassis;

(3) high assembling accuracy because the tape drive system is substantially disposed on the single flat chassis; and (4) prevention of the up-down tape movement because the supply side inclined pole is involved substantially less during loading, minimizing a possible tape damage.

It should be understood that the foregoing relates to only a preferred embodiment of the present invention, and that it is intended to cover all changes and modifications of the embodiment of this invention herein used for the purposes of the disclosure, which do not constitute departures from the spirit and scope of the invention.

What is claimed is:

1. A recording/reproducing apparatus comprising:
a guide drum having at least one recording or reproducing head for recording or reproducing information on or from a tape of a tape cassette mounted on said apparatus; and
a loading mechanism for loading said tape of said tape cassette into said apparatus by pulling said tape therefrom and wrapping the pulled tape around said guide drum so as to form a predetermined recording or reproducing tape path, said loading mechanism including first and second loading means each having a vertical pole and an inclined pole for supporting said tape on the tape loading mechanism, said first and second loading means being engaged with first and second channels defined on a chassis of said apparatus so as to be guided along said first and second channels from loading start positions where said tape is pulled therefrom up to loading termination positions where said tape is completely wrapped therearound, respectively, said vertical pole of each of said first and second loading means preceding with respect to said inclined pole thereof so that said tape is supported by means of only said vertical poles during the tape loading from said loading start positions to said loading termination positions, said inclined pole of at least said first loading means being angularly displaced by a predetermined angle with respect to said vertical pole when said vertical pole of said first loading means paired with said inclined pole to be angularly displaced reaches said loading termination position so that the angularly displaced inclined pole is brought into contact with said tape and supports said tape to result in the formation of said predetermined tape path.

2. A recording/reproducing apparatus as claimed in claim 1, wherein each of said first and second loading means has thereon engaging means which is adapted to be engaged with each of said first and second channels, said engaging means of at least said first loading means comprising first and second leg portions which are guided along said first channel so that said first leg portion precedes with respect to said second leg portion whereby said vertical pole of said first loading means precedes said inclined pole thereof during the tape loading.

3. A recording/reproducing apparatus as claimed in claim 2, wherein at least said first channel is branched in a vicinity of the loading termination position into first and second branch channels, and, when said first loading means reaches the vicinity of said loading termination position during the tape loading, said first leg portion of said first loading means being first introduced into said first branch channel and said second leg portion thereof being then introduced into said second branch channel so that said inclined pole is rotated by said predetermined angle with respect to said vertical pole and brought into contact with said tape to form said predetermined tape path.

* * * * *